Patented Dec. 8, 1925.

1,565,115

UNITED STATES PATENT OFFICE.

JAMES BUCKNER SPEED. OF NEW YORK, AND ARTHUR H. FALK, OF BROOKLYN, NEW YORK, ASSIGNORS TO WESTERN ELECTRIC COMPANY, INCORPORATED, OF NEW YORK. N. Y., A CORPORATION OF NEW YORK.

SOLDER.

No Drawing.    Application filed January 11, 1924.   Serial No. 685,666.

*To all whom it may concern:*

Be it known that we, JAMES B. SPEED and ARTHUR H. FALK, citizens of the United States of America, residing at New York city, in the county of New York, and Brooklyn, in the county of Kings and State of New York, respectively, have invented certain new and useful Improvements in Solder, of which the following is a full, clear, concise, and exact description.

This invention relates to improvements in solder, the object being to obtain a solder having a comparatively high melting point and great tensile strength.

The usual commercial solders are tin-lead alloys, hard solders or brazing alloys, and many other of the easily solderable metals. The tin-lead alloys have a tensile strength less than that of pure tin, and comparatively low melting points, varying from 180° C. to the melting point of tin which is 232° C., while the brazes have a fusion point of about 600° C.

For many purposes it is desirable to have a solder of greater tensile strength than block tin or tin-lead solder, but having a melting point considerably below that of the brazes. Moreover, tin which is ordinarily used in the soft soldering of iron and steel, is subject to an inherent weakness variously known as tin disease, tin pest or tin rot, which occurs when the tin is subjected to low temperatures.

It has been found that alloys of tin and silver have good soldering properties, have a greater tensile strength and a higher melting point than tin; and when properly proportioned are free from tin disease so that they make exceedingly good solders for iron and steel. The strength and melting point of these alloys make them applicable over a wider range of service and at more varied temperatures than is possible in the case of tin or lead-tin solders.

The proportions of tin and silver which may be employed in forming these alloys, may be considerably varied, changes in such proportions, of course, varying the melting point of the particular alloy formed, and also affecting the strength of the soldered joint. By actual test, it has been found that an alloy of tin and silver, containing approximately 11% of silver, gives a joint which is from 2 to 4 times stronger than tin or tin-lead solders.

The preferred proportons are 11% silver and 89% tin, but it will be appreciated that it is not intended to impose any restrictions upon the proportons of the ingredients employed, other than those set forth in the claims. While it has been found that a satisfactory solder is formed from commercially pure tin and silver, it has also been found that small additions not to exceed 3% of gold and palladium increase the strength and toughness of the solders.

Owing to the losses in melting which tend to make the proportions indefinite even when the correct weight of tin and silver are put together, it has been found convenient where an exact melting point is desired, to melt block tin in a crucible and add ingot silver, stirring the liquid mixture with a wooden stick to prevent dross, until the specific gravity, as determined on samples taken out and cooled has been obtained.

The following table shows the percentage composition and melting point corresponding to various specific gravities as determined in the above manner.

| Specific gravity | At which point the composition is: | | And the melting point— |
|---|---|---|---|
| | Silver | Tin | |
| 7.51 | 8% | 92% | 283° C. |
| 7.54 | 9% | 91% | 292° C. |
| 7.57 | 10% | 90% | 300° C. |
| 7.60 | 11% | 89% | 309° C. |
| 7.63 | 12% | 88% | 319° C. |
| 7.69 | 13% | 87% | 328° C. |

In addition to its high tensile strength and the fact that it can be used for soldering directly upon clean iron or steel, it is of great importance in connection with the soldering operations on enamel covered metal surfaces, because it can be made in such proportions as to have a comparatively high melting point and to be capable of being worked at a high temperature, where it was desired to solder enamel covered surfaces previously it was first necessary to remove the enamel by scraping or dissolving it from the metal surface. With the greater heat which may be used with this solder of the present invention, however, the majority of enamels used for insulating purposes will be broken down or destroyed to such an extent that the solder will readily attach itself to the metal surface. It is not possible, however, to work the ordinary solder at a temperature sufficiently high to accomplish this.

Another characteristic of the solder of this invention is that it will readily attach itself to the surfaces to be soldered at a temperature very slightly in excess of its melting or fusion point as compared with the ordinary solder which must be worked at a temperature considerably in excess of its fusion point. As a result, it requires but a touch of the soldering iron to make the joint with the new solder and but a very short time for the solder to set or freeze, since there is but a small amount of heat to be dissipated before the temperature of the solder reaches the freezing point. The advantage of this feature is that the heat of soldering does not have to be applied for any considerable extent of time with the consequent heating up of the bodies to be soldered. In the case of terminals embedded in or held between insulating material the conduction of heat along the body by extended application of a soldering temperature, has a tendency to soften the insulating material and loosen the terminal and this tendency is eliminated by the use of a solder of this invention.

What is claimed is:

1. A solder consisting of substantially 11% silver and 86 to 89% tin.

2. A solder consisting of substantially 11% silver, 3% of a second noble metal, and the remainder tin.

3. A solder composed of silver from 13% to 16%, a second noble metal up to 3% and the remainder tin.

4. A solder composed of an alloy consisting of tin and at least one noble metal, as its major constituents, in such proportions that its melting point lies between 280 and 330° C.

5. A solder composed of tin and at least one noble metal and containing 84 to 92% tin.

In witness whereof, we hereunto subscribe our names this 5th day of January A. D., 1924.

JAMES BUCKNER SPEED.
ARTHUR H. FALK.